US007665561B2

(12) United States Patent
Shiozaki et al.

(10) Patent No.: US 7,665,561 B2
(45) Date of Patent: Feb. 23, 2010

(54) POWER UNIT FOR A MOTORCYCLE, AND MOTORCYCLE INCORPORATING SAME

(75) Inventors: Tomoo Shiozaki, Saitama (JP); Toshimasa Mitsubori, Saitama (JP); Masahiro Shimizu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 39 days.

(21) Appl. No.: 12/005,244

(22) Filed: Dec. 26, 2007

(65) Prior Publication Data

US 2008/0156563 A1 Jul. 3, 2008

(30) Foreign Application Priority Data

Dec. 28, 2006 (JP) ............................ 2006-356243

(51) Int. Cl.
*B62M 7/00* (2006.01)

(52) U.S. Cl. ...................................... 180/219; 180/65.1

(58) Field of Classification Search ................. 180/219, 180/291; 474/17, 70
See application file for complete search history.

(56) References Cited

U.S. PATENT DOCUMENTS 6,666,290 B2 12/2003 Yamauchi
2002/0032088 A1* 3/2002 Korenjak et al. .............. 474/14
2002/0033295 A1* 3/2002 Korenjak et al. ............ 180/292
2006/0027192 A1* 2/2006 Tsukada et al. ............ 123/41.7
2007/0102215 A1* 5/2007 Pichler et al. ............... 180/190

FOREIGN PATENT DOCUMENTS

JP 2-80720 6/1990
JP 2001-065650 3/2001
JP 2002-104276 4/2002

* cited by examiner

*Primary Examiner*—Paul N Dickson
*Assistant Examiner*—Tashiana Adams
(74) *Attorney, Agent, or Firm*—Carrier, Blackman & Associates, P.C.; Joseph P. Carrier; William D. Blackman

(57) ABSTRACT

A motorcycle is provided with a compact, lightweight power unit that allows for increased maneuverability and increased bank angles while turning. The power unit includes an engine and transmission integrated into a single unit. Often, the balance and maneuverability of a motorcycle are influenced by the heaviest components of the vehicle, such as the engine or power unit. The present advantage is accomplished by providing the power unit with a water pump, oil pump and transmission which are balanced on the motorcycle, limiting the weight variations and protrusions from the motorcycle. This results in allowing the motorcycle to achieve greater bank angles for better turning speeds and maneuverability. It desirable to keep the vehicle center of gravity as low as possible in a motorcycle which is likely to lean steeply around corners. The present arrangement provides the vehicle with a lower center of gravity thereby increasing maneuverability.

20 Claims, 8 Drawing Sheets

POWER UNIT FOR A MOTORCYCLE, AND MOTORCYCLE INCORPORATING SAME

CROSS-REFERENCE TO RELATED APPLICATIONS

The present application claims priority under 35 USC §119 based on Japanese patent application No. 2006-356243, filed on Dec. 28, 2006. The entire subject matter of this priority document is incorporated by reference herein.

BACKGROUND OF THE INVENTION

1. Field of the Invention

The present invention relates to a power unit for a motorcycle, and more particularly to a motorcycle power unit which includes a hydraulically-operated continuously variable transmission, also known as CVT. While riding such a vehicle, it may be necessary to tilt or bank the motorcycle to one side or the other. Any structures, such as a water pump, protruding laterally outwardly from the vehicle could be damaged in such a steep banking maneuver. The overall balance of the motorcycle is also influenced by such protruding members.

2. Description of the Background Art

A number of power units including CVT transmissions have been applied to motorcycles. For an example, it has been known to provide a motorcycle power unit including an engine with a crankshaft, a drive pulley shaft and an integrated V-belt-type automatic transmission including a driven pulley shaft, and an output shaft which outputs power to a rear drive wheel. Such a motorcycle power unit includes a water pump which circulates cooling water for the inside of the engine, where the water pump is provided with a drive mechanism.

For example, Japanese published patent document JP-A-2001-65650 (page 2, FIG. 3—also published as JP Pat#3823630 to Shinobu) discloses a motorcycle power unit including a V-belt driven automatic transmission. In the engine disclosed in the Shinobu reference, the drive shaft, crankshaft, and output shaft are arranged parallel to each other.

In addition, it is known that any components extending laterally outwardly from the motorcycle engine will affect the banking ability of the vehicle, since during a steep banking turn, such outwardly extending components may contact the ground and become damaged. (As used herein, the term "banking" refers to leaning during turns). Thus, it is desirable to limit the number and type of these laterally extending members to prevent damage to them and to the motorcycle. In addition, since the weight and height of the engine will affect the center of gravity of the motorcycle, it is desirable to have a compact, lightweight engine.

With respect to some known motorcycle power units of this type, the water pump is mounted on an end of the drive pulley shaft. Accordingly, compared with an engine which mounts a water pump on a shaft other than the drive pulley shaft, additional drive parts for the pump and an arrangement space for the pump become unnecessary and, the engine can be made smaller and more compact. On the other hand, in this known arrangement, the water pump projects laterally outwardly from a side surface of the engine and therefore, there exists a possibility that the bank angle and balance of the vehicle is adversely affected by such an arrangement.

BRIEF SUMMARY OF THE INVENTION

The present invention has been made to overcome such drawbacks, and it is an object of the invention to provide an improved power unit for a motorcycle which can prevent a water pump from influencing the bank angle of the motorcycle, even when the water pump is arranged on an end portion of a drive pulley shaft.

To achieve the above-mentioned object, a first aspect of the present invention is directed to a power unit for a motorcycle, including an engine having a crankshaft and a continuously variable transmission which includes a drive pulley shaft to which a rotary drive force of the crankshaft is transmitted. The transmission also includes a drive pulley which is mounted on the drive pulley shaft, a driven pulley shaft to which a rotary drive force of the drive pulley shaft is transmitted, a driven pulley which is mounted on the driven pulley shaft, and a belt which is extended between and wrapped around the drive pulley and the driven pulley for transmitting the rotary drive force of the drive pulley shaft to the driven pulley shaft.

In the above-described power unit according to the first aspect hereof, a water pump which circulates cooling water in the inside of an engine is also provided, and all of these components are arranged such that during engine operation, the rotary drive force of the crankshaft is transmitted to a drive wheel while changing a vehicle speed continuously by changing wrapping diameters of the belt on the drive pulley and the driven pulley, the drive pulley is arranged above the driven pulley shaft and, at the same time, the water pump is arranged on a shaft end of the drive pulley shaft.

In accordance with a second aspect of the invention, the engine includes an oil pump which supplies oil to the continuously variable transmission, a transmission input clutch and a starter clutch, and the oil pump and the water pump are arranged proximate one another on an end portion of the drive pulley shaft.

In accordance with a third aspect of the invention, a transmission input clutch, which selectively allows or interrupts the transmission of the rotary drive force of the crankshaft to the drive pulley, is arranged between the crankshaft and the drive pulley. The transmission input clutch is arranged on one longitudinal side of the vehicle at one side of the drive pulley shaft, and the oil pump and the water pump are arranged, proximate one another, on another longitudinal side of the vehicle at a second side of the drive pulley shaft, while sandwiching the continuously variable transmission therebetween.

In accordance with a forth aspect of the invention, the engine includes a bearing which rotatably supports the drive pulley, and the oil and water pumps are arranged on a longitudinally outer or opposite side of the drive pulley shaft from the bearing.

In accordance with a fifth aspect of the invention, the water pump is arranged above the center of the crankshaft.

In accordance with a sixth aspect of the invention, the transmission input clutch selectively allows or interrupts the transmission of the rotary drive force of the crankshaft to the drive pulley. The transmission input clutch is arranged between the crankshaft and the drive pulley. A starter clutch, which allows or interrupts the transmission of a rotary drive force of the driven pulley shaft to the drive wheel, is arranged between the driven pulley and the drive wheel, with the transmission input clutch arranged on the drive pulley shaft, and the starter clutch arranged on the driven pulley shaft.

In accordance with a further aspect of the invention, the drive pulley is arranged above the driven pulley shaft and, at the same time, having the water pump arranged on the shaft end of the drive pulley shaft and the water pump is arranged at a position higher than the driven pulley shaft, that is, at an upper, high position of the engine. Accordingly, even when the water pump is arranged on the shaft end of the drive pulley shaft, it is possible to prevent the water pump from influencing the bank angle of a vehicle.

In accordance with another aspect of the invention, the engine includes the oil pump which supplies oil to the continuously variable transmission, the transmission input clutch and the starter clutch. The oil pump and the water pump are arranged on the shaft end of the drive pulley shaft with the oil pump arranged on the shaft portion of the drive pulley shaft in the same manner as the water pump. Accordingly, it is possible to eliminate the drive parts of the oil pump and space for the drive parts when the oil pump is arranged in a location other than on the drive pulley shaft. Accordingly, the number of parts can be reduced limiting the weight of the engine and creating a compact, lightweight engine.

In accordance with still another aspect of the invention, the clutch, which allows or interrupts the transmission of the rotary drive force of the crankshaft to the drive pulley, is arranged between the crankshaft and the drive pulley. The clutch is arranged on one side of the drive pulley shaft and the oil pump and the water pump are arranged on another side of the drive pulley shaft with the continuously variable transmission positioned between them. Accordingly, the clutch, the oil pump and the water pump, which are heavy objects, are arranged on both sides in the vehicle-width direction in a well-balanced manner while sandwiching the continuously variable transmission therebetween. Therefore, the maneuverability of the vehicle can be enhanced utilizing this arrangement. Further, it is possible to prevent the water pump from projecting in the vehicle width direction on one side of the engine.

In accordance with yet another aspect of the invention, the engine includes a bearing which rotatably supports the drive pulley, and the oil pump and the water pump are arranged on the longitudinally outer side or opposite side of the drive pulley shaft than this bearing. Accordingly, compared to a engine in which the oil pump and the water pump are arranged on the longitudinally inner side of the bearing, the distance between the bearing and the pulley can be shortened allowing the diameter of a sleeve shaft portion of the drive pulley to be decreased. Accordingly, the diameter of the shaft on the drive-pulley side can be decreased the drive pulley can be made smaller and, at the same time, the engine can be made lighter. Further, since the oil pump and the water pump are arranged on the longitudinally outer side of the bearing, assembly and maintenance of the engine can be enhanced. Therefore, when the oil pump and the water pump are arranged on the longitudinally inner side of the bearing, the distance between the bearing and the pulley is elongated and it is necessary to increase the diameter of the sleeve shaft portion of the drive pulley to ensure strength and rigidity resulting in the increased weight of the engine.

In accordance with a still further aspect of the invention, the water pump is arranged above the center of the crankshaft whereby the water pump is arranged at a position higher than the crankshaft, that is, at an upper, higher position of the engine. Accordingly, even when the water pump is arranged on a shaft end of the drive pulley shaft, it is possible to prevent the water pump from influencing the bank angle of a vehicle.

In accordance with a further aspect of the invention, the transmission input clutch, which allows or interrupts the transmission of the rotary drive force of the crankshaft to the drive pulley, is arranged between the crankshaft and the drive pulley. The starter clutch, which allows or interrupts the transmission of a rotary drive force of the driven pulley shaft to the drive wheel, is arranged between the driven pulley and the drive wheel. The transmission input clutch is provided on the drive pulley shaft, and the starter clutch is provided on the driven pulley shaft. Accordingly, since the starter clutch, which is heavier than the transmission input clutch, is arranged below the drive pulley shaft, even though the oil pump and the water pump are arranged on the drive pulley shaft so that the center of gravity of the engine tends to be elevated, it is possible to prevent the elevation of the center of gravity. Here, the starter clutch transmits a larger rotary drive force than the transmission input clutch at the time of starting the vehicle or the like resulting in the clutch capacity of the starter clutch being increased since the starter clutch becomes heavier than the transmission input clutch.

For a more complete understanding of the present invention, the reader is referred to the following detailed description section which should be read in conjunction with the accompanying drawings. Throughout the following detailed description and in the drawings, like numbers refer to like parts.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

Figure 1:
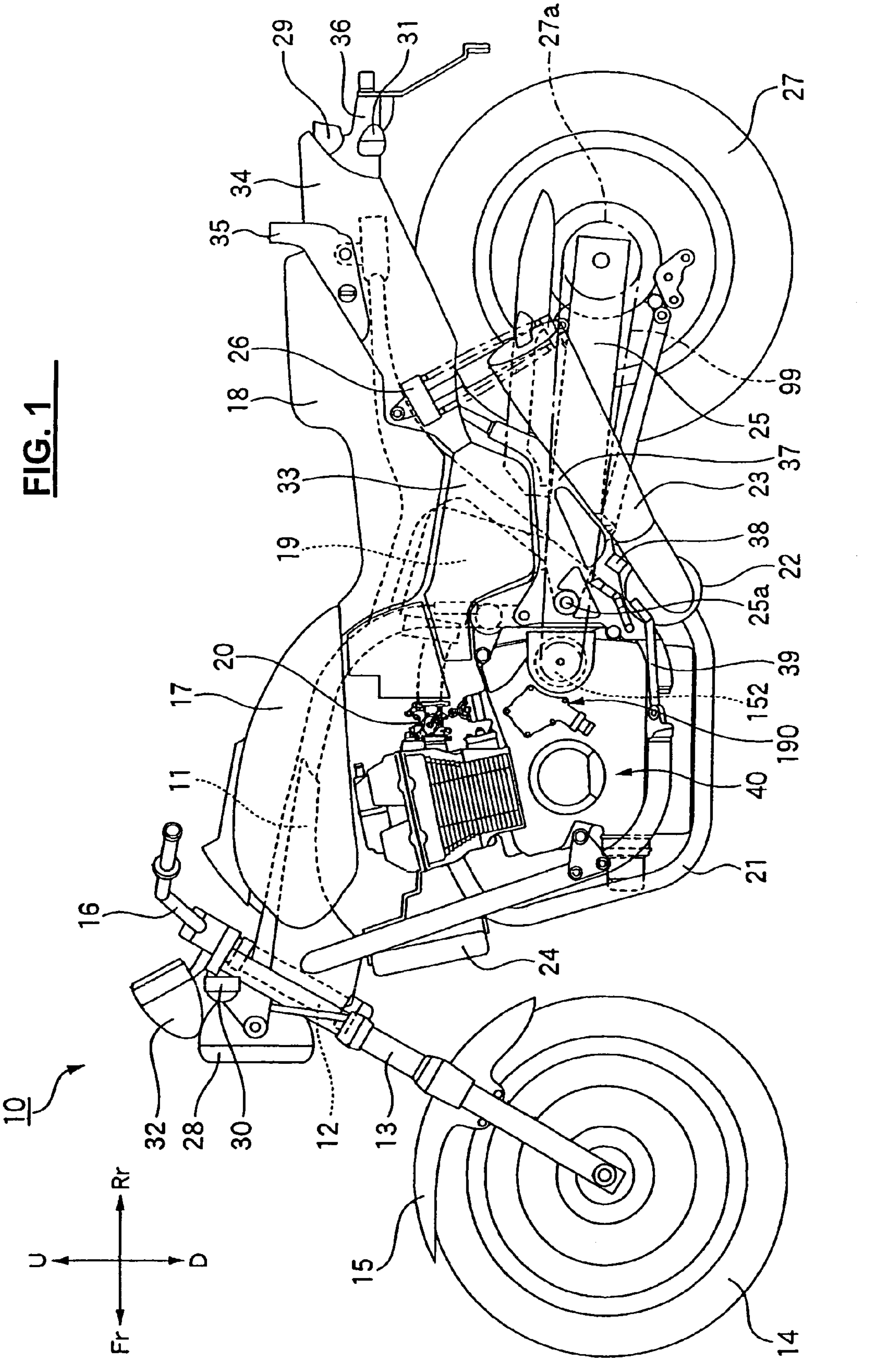
FIG. 1 is a side plan view of a motorcycle in accordance with the invention which mounts a power unit thereon.

A motorcycle 10 includes, as shown in FIG. 1, a cradle type vehicle body frame 11 having a front fork 13 which is mounted on a head pipe 12 of the vehicle body frame 11, a front wheel 14 and a front fender 15 which are mounted on the front fork 13, a handle or handlebar 16 which is connected to the front fork 13, a fuel tank 17 which is mounted on a front upper portion of the vehicle body frame 11 in a straddling manner, and a seat 18. Seat 18 may comprise a double seat having a driver's seat and a rider's seat mounted on a rear upper portion of the vehicle body frame 11.

A power unit 40 is arranged in the inside of a cradle space surrounded by respective pipes of the vehicle body frame 11. An air cleaner 19 is arranged behind the cradle space and below the seat 18 with a carburetor 20 connected between the air cleaner 19 and an intake port of the power unit 40. An exhaust pipe 21 connected to the exhaust port of the power unit 40 includes a conversing portion 22 and a silencer 23. A radiator 24 is provided in front of the power unit 40.

A swing arm 25 may be mounted behind the vehicle body frame 11 by way of a pivot shaft 25*a* and include a rear suspension 26 suspending a rear end portion of the swing arm 25 from the vehicle body frame 11, and a rear wheel or drive wheel 27 mounted on a rear portion of the swing arm 25. FIG. 1 also shows the vehicle having a head lamp 28, a tail lamp 29, front blinker or turn indictor 30, rear blinker or turn indicator 31, meter 32, such as a speedometer or other measuring device, side cover 33, rear cowl 34, grab rail 35, rear fender 36, step bracket 37, step 38, and stand 39, such as a kickstand.

Figure 2:
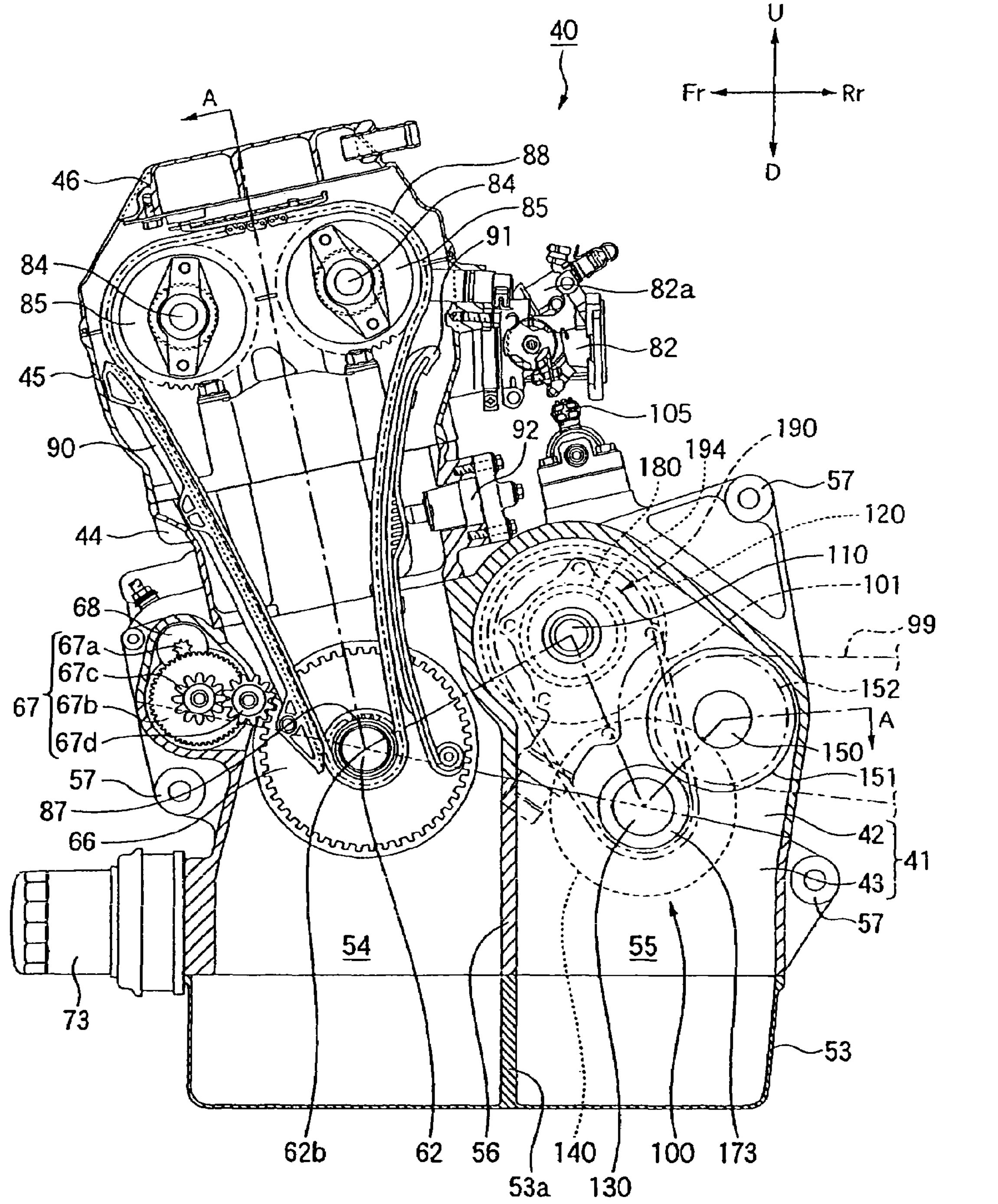
FIG. 2 is a left side view showing a portion of the power unit of the motorcycle shown in FIG. 1.
Figure 3:
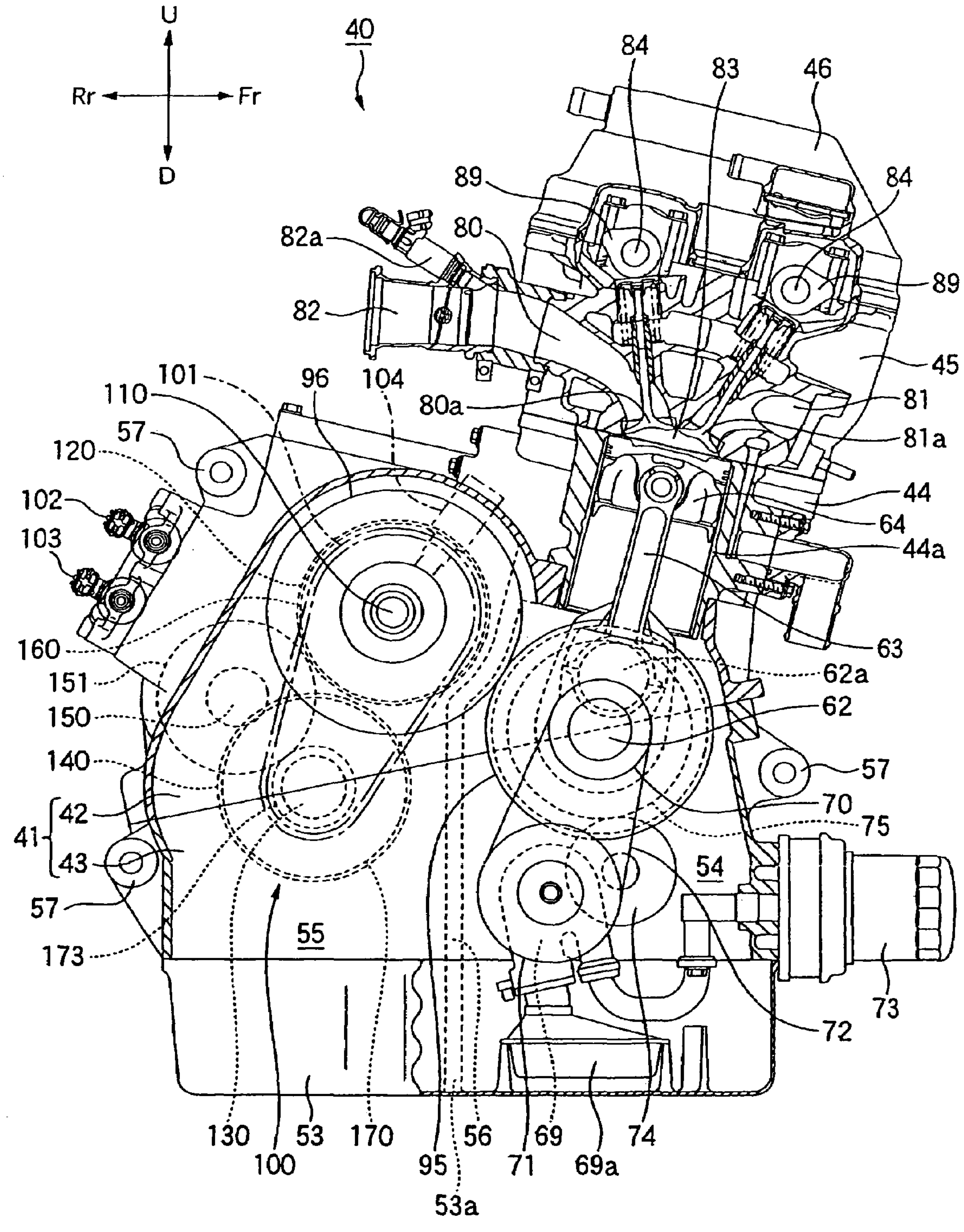
FIG. 3 is a right side showing a portion of the power unit of the motorcycle shown in FIG. 1.
Figure 4:
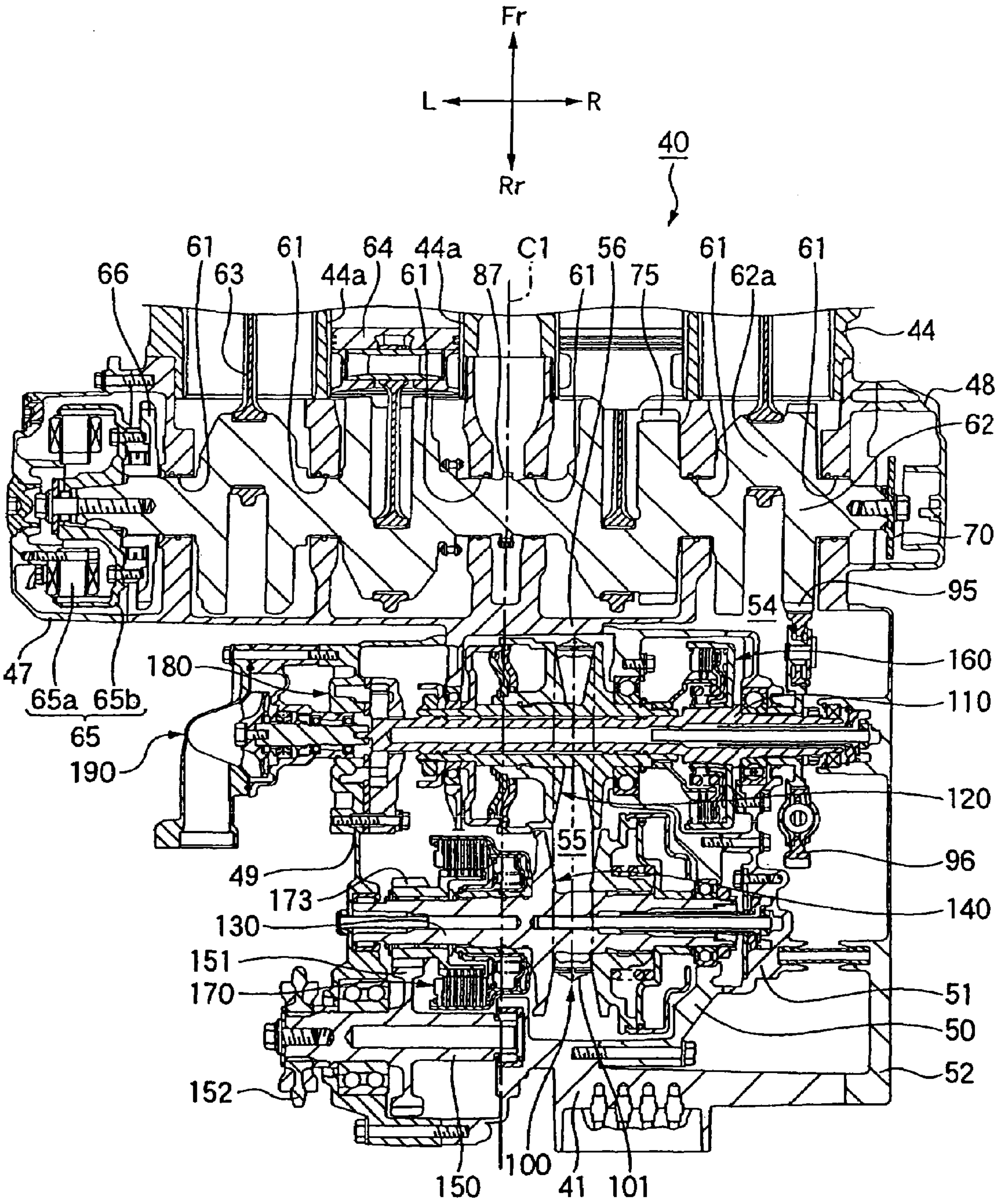
FIG. 4 is a cross-sectional view taken along line A-A in FIG. 2.

The power unit 40 includes an engine and a transmission integrated into a single unit. The engine is a water-cooled type, 4-cylinder engine. As shown in FIG. 2 to FIG. 4, an outer shell of the power unit 40 is mainly comprised of a crankcase 41 formed of an upper case 42 and a lower case 43, a cylinder block 44 mounted on a front upper end portion of the crankcase 41, a cylinder head 45 mounted on an upper end portion of the cylinder block 44, and a head cover 46 covering an upper opening of the cylinder head 45. A first crankcase cover 47, best seen in FIG. 4, covering a front left opening of the crankcase 41 and a second crankcase cover 48 covering a front right opening of the crankcase 41. A first transmission case 49 covers a rear left opening of the crankcase 41, a second transmission case 50 covers a rear right opening of the crankcase 41, and a transmission case cover 51 covers a right opening of the second transmission case 50. A third crankcase cover 52 covers an outer opening of the transmission case cover 51 of the crankcase 41, and an oil pan 53 covers a lower end opening of the crankcase 41.

Then, ranging from a front portion to a right rear portion of the power unit 40, a crank chamber 54 is formed by the crankcase 41, the second transmission case 50, the transmission case cover 51 and the third crankcase cover 52. On a rear portion of the power unit 40, a transmission chamber 55 is formed of the crankcase 41, the first transmission case 49 and the second transmission case 50. In the crankcase 41, a partition wall 56 which defines the crank chamber 54 and the transmission chamber 55 by partitioning is formed. Also in the oil pan 53, a partition wall 53*a* defines the crank chamber 54 and the transmission chamber 55 which is formed by a member such that the partition wall 53*a* is contiguously formed with the partition wall 56. A chamber which stores engine oil is formed in a front portion of the oil pan 53, and a chamber which stores transmission oil is formed in a rear portion of the oil pan 53. Such an arrangement allows for the use of oils which are respectively suitable for the power unit 40 and the continuously variable transmission 100.

Figure 7:
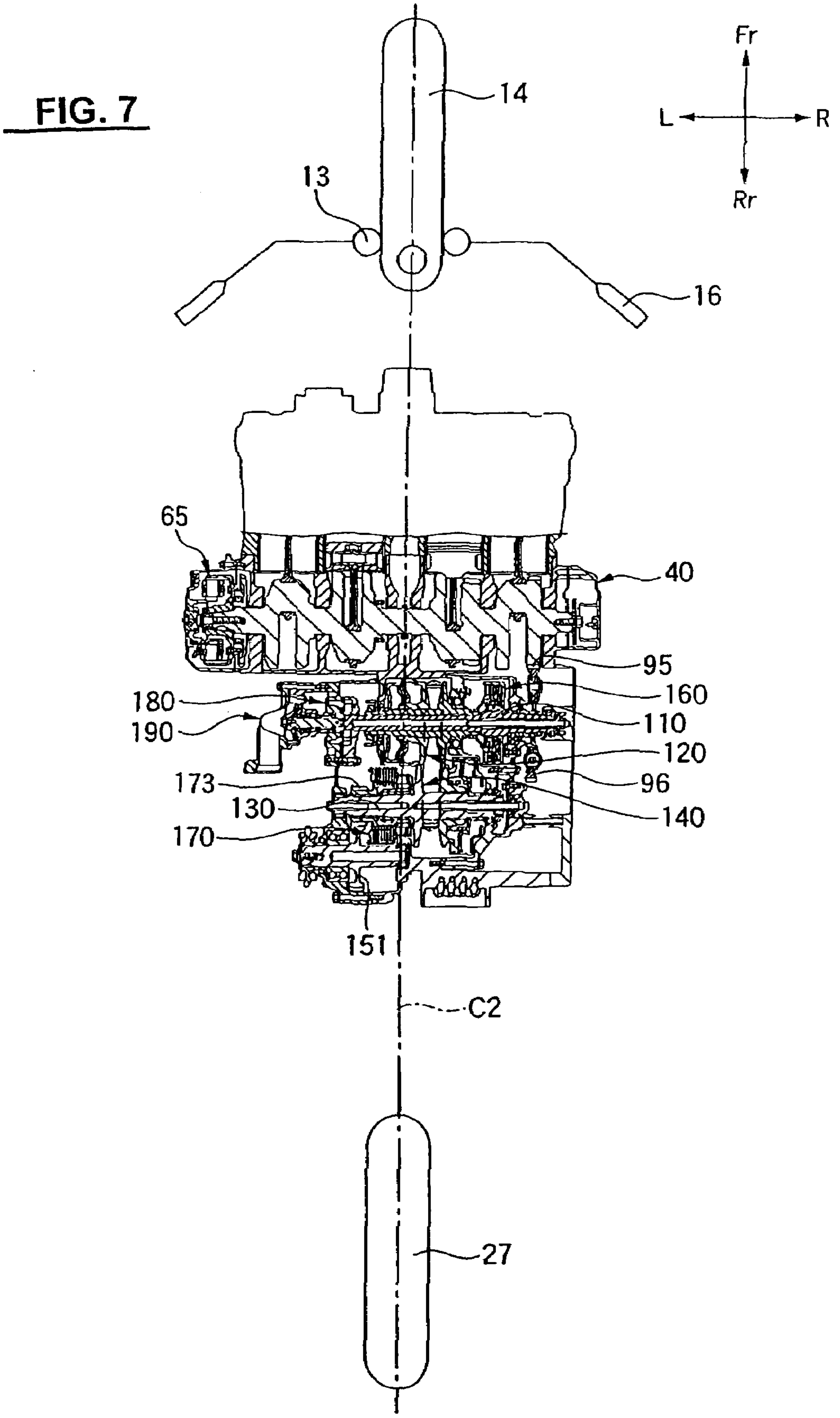
FIG. 7 is a schematic view of the relationship of the power unit with respect to the vehicle.

The power unit 40 is mounted on the vehicle body frame 11 by way of engine hangers 57 which are respectively formed on a front portion, a rear upper portion and a rear lower portion of the crankcase 41. As shown in FIG. 7, the power unit 40 is arranged such that an engine center line C1, best seen in FIG. 4, in the vehicle width or transverse direction overlaps a vehicle body center line C2 in the vehicle width direction of the motorcycle 10 as viewed in a plan view.

As shown in FIG. 4, the inside of the crank chamber 54 has a crankshaft 62 rotatably supported by six journal bearings 61 which are mounted on the crankcase 41. As shown in FIG. 3, pistons 64 are connected to crankpins 62*a* of the crankshaft 62 by way of connecting rods 63 of the respective cylinders, and the pistons 64 perform a reciprocating motion in the cylinder axial direction in the inside of cylinder liners 44*a* of the cylinder block 44.

Further, as shown in FIG. 4, an AC generator 65 is mounted on a left or first end portion of the crankshaft 62. The AC generator 65 includes a stator 65*a* which is mounted on an inner surface of the first crankcase cover 47 and a rotor 65*b* which is mounted on a left end portion of the crankshaft 62 and surrounds the stator 65*a*.

Further, as shown in FIG. 4, the crankshaft 62 includes a starter driven gear 66 which is mounted close to the AC generator 65. The starter driven gear 66 transmits a rotary drive force of a starter motor 68 to the crankshaft 62 by way of a gear train 67, best seen in FIG. 2. The gear train 67 is constituted of a starter pinion gear 67*a*, a first idling driven gear 67*b*, a first idling drive gear 67*c* and a second idling gear 67*d*, and is connected to the starter driven gear 66.

Further, as shown in FIG. 4, a right end portion of the crankshaft 62 includes a pump drive sprocket wheel 70 for driving an oil pump 69 which supplies oil to respective portions of the power unit 40 is mounted. The pump drive sprocket wheel 70 transmits a rotary drive force of the crankshaft 62 to the oil pump 69 by way of a pump chain 72 which is extended between and wrapped around a pump driven sprocket wheel 71 mounted on a drive shaft of the oil pump 69 and the pump drive sprocket wheel 70, best seen in FIG. 3. The oil pump 69 draws engine oil which is stored in a front portion of the oil pan 53 and below the crank chamber 54, through an oil strainer 69*a* and supplies the engine oil to lubricate portions of the inside of the cylinder block 44. The cylinder head 45 includes the head cover 46 and the crank chamber 54. Also shown in FIGS. 2 and 3 is an oil filter element 73.

Further, as shown in FIG. 3, the shaft portion of the crankshaft 62 includes a balancer drive gear 75 which is meshed or synchronized with a balancer gear 74 rotatably supported on the crankcase 4. The balancer gear 74 is rotatably driven at a rotary speed twice as large as a rotary speed of the crankshaft 62.

In the cylinder head 45, as shown in FIGS. 2 and 3, an intake port 80 in which an intake valve 80*a* is arranged and an exhaust port 81 in which an exhaust valve 81*a* is arranged are formed. In the intake port 80, a throttle body 82 which includes an electronically controlled injector 82*a* is assembled. The throttle body 82 is controllably connected to an engine control unit (not shown in the drawing), and supplies an optimum air/fuel mixture corresponding to a rotary speed of the power unit 40 to the inside of the intake port 80 in response to an electric signal from the engine control unit.

Further, a combustion chamber 83 is formed in a lower surface of the cylinder head 45 and a spark plug (not shown in the drawing) is mounted on the cylinder head 45 such that the spark plug faces the combustion chamber 83. As shown in FIG. 2 and FIG. 3, the inside of the cylinder head 45 includes two cam shafts 84, 84 consisting of a valve operating mechanism rotatably supported therein, and cam driven sprocket wheels 85, 85 fixed to respective left end portions of the cam shafts 84, 84. By extending a cam chain 88 between the cam driven sprocket wheels 85, 85 and a cam drive sprocket wheel 87, which is mounted on a center portion of the crankshaft 62, and by wrapping the cam chain 88 around these sprocket wheels 85, 85, 87, the rotary drive force of the crankshaft 62 is transmitted to the cam shafts 84, 84 and, at the same time, the cams 89 mounted on the axes of the cam shafts 84, 84 are rotatably driven so that the intake valve 80*a* and the exhaust valve 81*a* are opened and closed at a predetermined timing. FIG. 2 further shows chain guide 90, chain tensioner 91, and tensioner lifter 92.

In addition, as shown in FIG. 4, the shaft portion of the crankshaft 62 consists of a crankshaft output gear or primary drive gear 95 which transmits a rotary drive force of the crankshaft 62 to the continuously variable transmission 100 arranged in the transmission chamber 55. The crankshaft output gear 95 is meshed with a transmission input gear or primary driven gear 96 which is mounted on a right end portion of a drive pulley shaft 110 of the continuously variable transmission 100 by a spline fitting.

Figure 5:
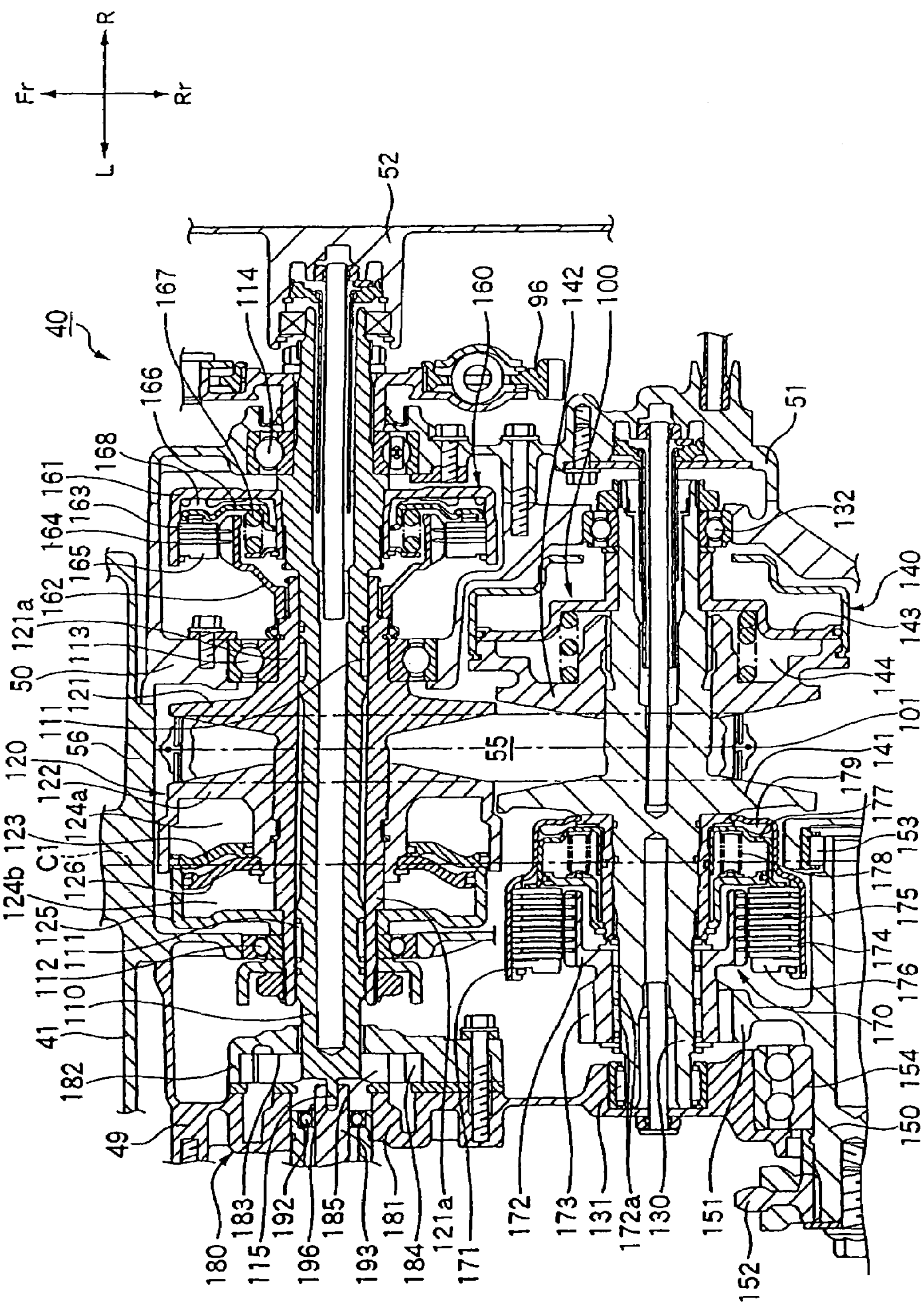
FIG. 5 is an enlarged cross-sectional view of the continuously variable transmission shown in FIG. 4.

The continuously variable transmission 100 includes, as shown in FIG. 5, the drive pulley shaft 110 to which the rotary drive force of the crankshaft 62 is transmitted, a drive pulley 120 which is mounted on the drive pulley shaft 110, a driven pulley shaft 130 to which a rotary drive force of the drive pulley shaft 110 is transmitted, a driven pulley 140 which is mounted on the driven pulley shaft 130, and a belt 101 which is extended between and wrapped around the drive pulley 120 and the driven pulley 140 and transmits the rotary drive force of the drive pulley shaft 110 to the driven pulley shaft 130. The continuously variable transmission 100 transmits the rotary drive force of the crankshaft 62 to the rear wheel 27 while changing a vehicle speed in a stepless manner by changing wrapping diameters of the belt 101 on the drive pulley 120 and the driven pulley 140. Further, in this embodiment, the crankshaft 62 is arranged parallel to the vehicle width direction and the drive pulley shaft 110 is arranged in parallel to the crankshaft 62. Accordingly, the longitudinal direction of the drive pulley shaft 110 indicates the vehicle width orientation.

The drive pulley 120 is rotatably supported on the shaft portion of the drive pulley shaft 110 by way of roller bearings 111, 111, and the drive pulley 120 is rotatably supported on ball bearings 112, 113, 114 which are mounted on the crankcase 41, the second transmission case 50 and the transmission case cover 51. Further, the drive pulley 120 consists of a drive pulley fixed half body 121 and a drive pulley movable half body 122, wherein one drive pulley fixed half body 121 includes a cylindrical shaft portion 121*a* which is integrally formed with the drive pulley fixed half body 121, and is rotatably supported on the drive pulley shaft 110 as described above, while another drive pulley movable half body 122 is fitted on the drive pulley fixed half body 121 in the axially movable manner and in a relatively non-rotatable manner. Further, a drive pulley oil chamber 124*a* is formed between the drive pulley movable half body 122 and a partition plate 123 and, at the same time, a drive pulley oil chamber 124*b* is formed between a fixed bowl-shaped body 125 fitted on the sleeve shaft portion 121*a* and a partition plate 126. Oil pressures in the inside of the drive pulley oil chambers 124*a*, 124*b* are controlled by a drive pulley control valve 102 (see FIG. 3). Here, when the oil pressure inside of the drive pulley oil chambers 124*a*, 124*b* are increased, the drive pulley movable half body 122 is pushed in the direction such that the drive pulley movable half body 122 approaches the drive pulley fixed half body 121.

The driven pulley shaft 130 is rotatably supported on a roller bearing 131 and a ball bearing 132 mounted on the first transmission case 49 and the second transmission case 50. Further, the driven pulley 140 consists of a driven pulley fixed half body 141 and a driven pulley movable half body 142, wherein one driven pulley fixed half body 141 is integrally formed with the driven pulley shaft 130 by molding, while another driven pulley movable half body 142 is fitted on the driven pulley shaft 130 in the axially movable manner and in a relatively non-rotatable manner. Further, a driven pulley oil chamber 144 is formed between the driven pulley movable half body 142 and a partition plate 143. Oil pressure in the inside of the driven pulley oil chamber 144 is controlled by the driven pulley control valve 103 (see FIG. 3). Here, when the oil pressure in the inside of the driven pulley oil chamber 144 is increased, the driven pulley movable half body 142 is pushed in the direction such that the driven pulley movable half body 142 approaches the driven pulley fixed half body 141.

Further, in the inside of the transmission chamber 55, an output shaft 150 transmits a rotary drive force of the driven pulley shaft 130 to the rear wheel 27 rotatably supported by a roller bearing 153 and a double row ball bearing 154 which are mounted on the crankcase 41 and the first transmission case 49. On the output shaft 150, a final driven gear 151 is mounted. Further, on a left end portion of the output shaft 150, a drive sprocket wheel 152 transmits a rotary drive force of the output shaft 150 to a driven sprocket wheel 27*a* of the rear wheel 27 by way of a drive chain 99.

In a further embodiment, as shown in FIG. 5, provided between the drive pulley shaft 110 and the drive pulley 120, a transmission input clutch 160 which allows or interrupts the transmission of a rotary drive force of the crankshaft 62 to the drive pulley 120 is arranged. Between the driven pulley 140 and the output shaft 150, a starter clutch 170 will allow or interrupt the transmission of a rotary drive force of the driven pulley shaft 130 to the output shaft 150 is provided. Here, the transmission input clutch 160 is arranged on the drive pulley shaft 110, while the starter clutch 170 is arranged on the driven pulley shaft 130.

The transmission input clutch 160 includes a clutch outer 161 which is mounted on the shaft portion of the drive pulley shaft 110 and is fixed to the drive pulley shaft 110, a clutch inner 162 which is fixed to the drive pulley fixed half body 121 of the drive pulley 120, a plurality of drive friction discs 163 which is fixed to an inner peripheral surface of the clutch outer 161, a plurality of driven friction discs 164 which is arranged alternately with the drive friction discs 163 and is fixed to an outer peripheral surface of the clutch inner 162, a pressure receiving plate 165 which is fixed to an inner peripheral surface of the clutch outer 161 close to the plurality of drive friction discs 163, a pressurizing plate 166 which is axially movably mounted on a boss portion of the clutch outer 161 and pushes the drive friction discs 163 and the driven friction discs 164 to the pressure receiving plate 165, and a coil spring 167 which constantly biases the pressurizing plate 166 in the direction that the clutch is disengaged. Further, a transmission input clutch oil chamber 168 is formed between the clutch outer 161 and the pressurizing plate 166, and the oil pressure in the inside of the transmission input clutch oil chamber 168 is controlled by a transmission input clutch control valve 104 (see FIG. 3). Here, when the oil pressure in the inside of the transmission input clutch oil chamber 168 is increased, the pressurizing plate 166 is pushed against a biasing force of the coil spring 167 and hence, the transmission input clutch 160 is engaged whereby the drive pulley 120 is rotatably driven together with the drive pulley shaft 110.

The starter clutch 170 includes a clutch outer 171 which is arranged on the driven pulley shaft 130 and is fixed to the driven pulley shaft 130, a clutch inner 172 which is relatively rotatably mounted on the driven pulley shaft 130 by way of a roller bearing 172*a*, and integrally forms a final drive gear 173 which is meshed with the final driven gear 151 of the output shaft 150 on an outer peripheral surface of the boss portion thereof by molding. A plurality of drive friction discs 174 are fixed to an inner peripheral surface of the clutch outer 171 and a plurality of driven friction discs 175 are arranged alternately with the drive friction discs 174 and are fixed to an outer peripheral surface of the clutch inner 172. A pressure receiving plate 176 is fixed to an inner peripheral surface of the clutch outer 171 close to the plurality of drive friction discs 174 and a pressurizing plate 177 which is axially movably mounted on a boss portion of the clutch outer 171 and pushes the drive friction discs 174 and the driven friction discs 175 to the pressure receiving plate 176. A coil spring 178 constantly biases the pressurizing plate 177 in the direction that the clutch is disengaged. Further, a starter clutch oil chamber 179 is formed between the clutch outer 171 and the pressurizing plate 177, and the oil pressure in the inside of the starter clutch oil chamber 179 is controlled by the starter clutch control valve 105 (best seen FIG. 2). Here, when the oil pressure in the inside of the starter clutch oil chamber 179 is increased, the pressurizing plate 177 is pushed against a biasing force of the coil spring 178 and thus, the starter clutch 170 is engaged whereby the final drive gear 173 is rotatably driven together with the driven pulley shaft 130.

Further, in this embodiment, as shown in FIG. 2 to FIG. 4, the drive pulley shaft 110 and the drive pulley 120 are arranged above the driven pulley shaft 130 and, at the same time, an oil pump 180 and a water pump 190 are arranged on a first end of the drive pulley shaft 110. Further, the transmission input clutch 160 is arranged on one longitudinal side (right side in FIG. 4) of the drive pulley shaft 110, and the oil pump 180 and the water pump 190 are arranged on another longitudinal side (left side in FIG. 4) of the drive pulley shaft 110 while sandwiching the continuously variable transmission 100 therebetween. Further, the water pump 190 is arranged above an axis center **62*b* of the crankshaft 62**.

Further, in this embodiment, as shown in FIG. 4 and FIG. 5, the oil pump 180 and the water pump 190 are arranged on the longitudinally outer side of the ball bearing 112 which rotatably supports the drive pulley shaft 110 on the crankcase 41.

Figure 6:
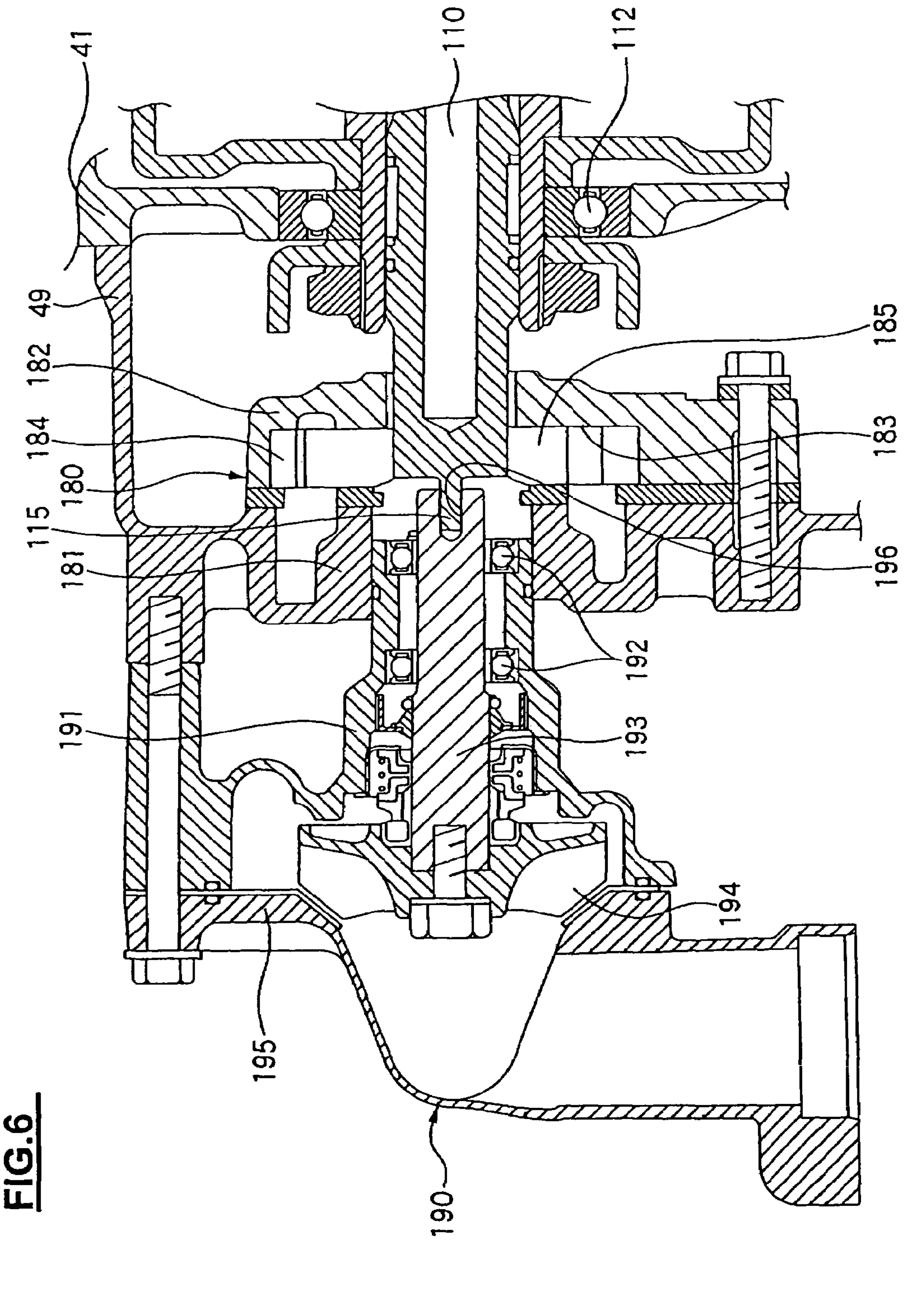
FIG. 6 is an enlarged cross-sectional view of an oil pump and a water pump shown in FIG. 4.

As best seen in FIG. 6, the oil pump 180 is a trochoid-type pump and includes an oil pump body 181 which is integrally formed on an outer side wall of the first transmission case 49 by molding, an oil pump cover 182 which is mounted on the oil pump body 181 and forms a recessed hole 183 therein, an outer rotor 184 which is inserted in the inside of the recessed hole 183, and an inner rotor 185 which is inserted in the inside of the outer rotor 184 and is joined to the drive pulley shaft 110 by a spline fitting. The oil pump 180 is rotatably driven together with the drive pulley shaft 110. Here, the oil pump 180 draws CVT or continuously-variable-transmission oil that is stored in a rear portion of the oil pan 53 and below the transmission chamber 55 through an oil strainer (not shown in the drawing) and supplies the oil to a lubricate portions of the inside of the transmission chamber 55, the drive pulley 120, the driven pulley 140, the transmission input clutch 160, the starter clutch 170 and the like.

Still referring to FIG. 6, the water pump 190 includes a water pump body 191 which is mounted on an outer surface of the first transmission case 49, a pump shaft 193 which is rotatably supported by two ball bearings 192, 192 mounted in the inside of the water pump body 191, rotary blades 194 which are mounted on a left end portion of the pump shaft 193, and a water pump cover 195 which is mounted on the water pump body 191 and defines a pump chamber between the water pump body 191 and the water pump cover 195. Further, a recessed portion 196 is formed in a right end portion of the pump shaft 193, and a projecting portion 115 formed on a left end portion of the drive pulley shaft 110 is fitted in the recessed portion 196. Such an arrangement provides the drive pulley shaft 110 and the pump shaft 193 connected to each other and therefore the water pump 190 is rotatably driven together with the rotation of the drive pulley shaft 110. Accordingly, the water pump 190 circulates cooling water in the inside of the power unit 40 by way of a cooling water circulation passage (not shown in the drawing).

Figure 8:
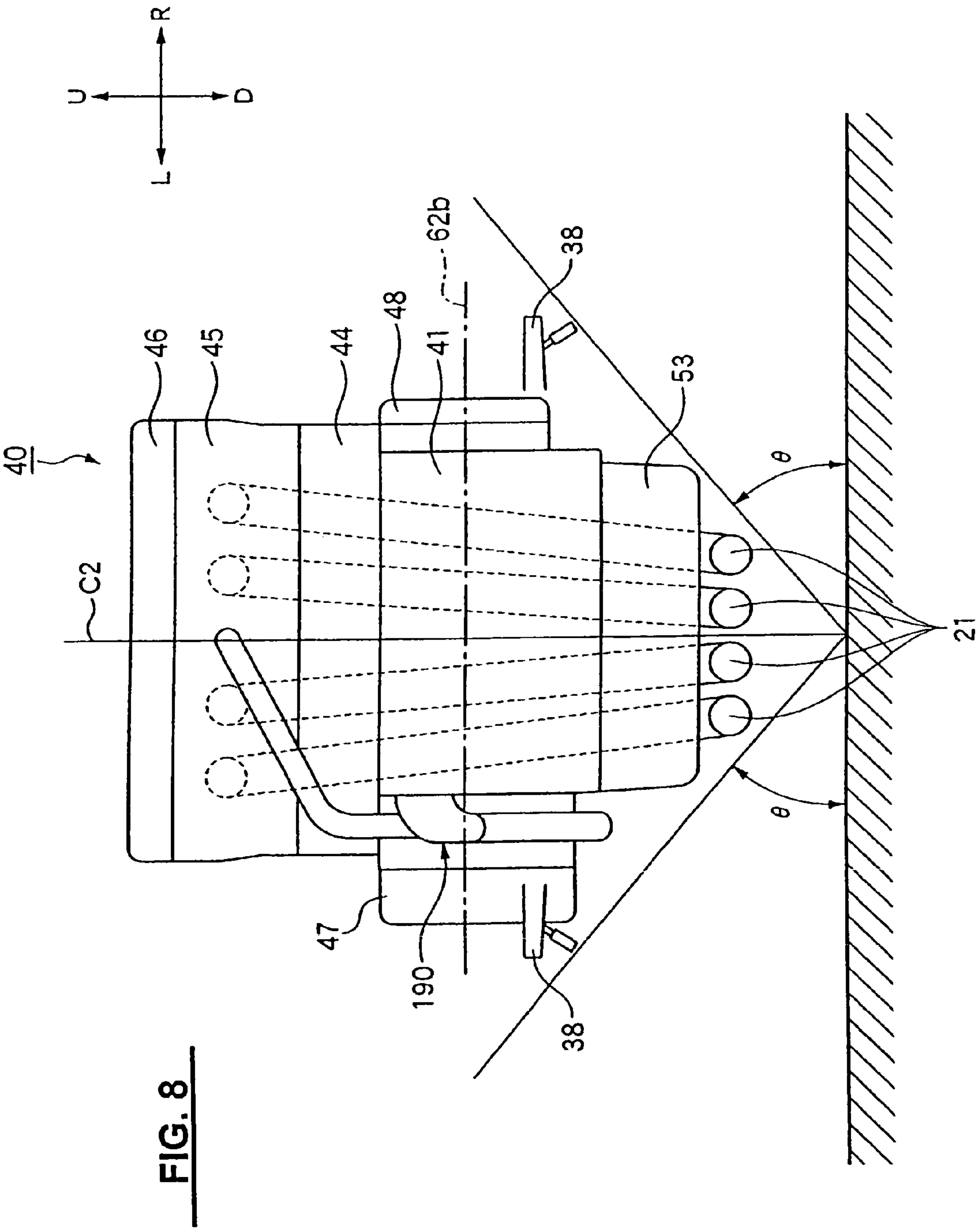
FIG. 8 is a schematic view of the power unit with respect to the bank angle of a vehicle.

In the power unit 40 of a motorcycle having such an arrangement, best seen in FIG. 8, by arranging the oil pump 180 and the water pump 190 on the shaft end of the drive pulley shaft 110 (although the water pump 190 projects from the side surface of the power unit 40) and by arranging the drive pulley shaft 110 above the driven pulley shaft 130, the oil pump 180 and the water pump 190 are arranged at a position higher than the driven pulley shaft 130, that is, at an upper high position of the power unit 40 and hence, the oil pump 180 and the water pump 190 do not influence the bank angle θ of the vehicle 10 as determined by the step 38 (the bank angle θ being made by the step 38 and the vehicle center line C2 in this embodiment).

According to the power unit 40 of the motorcycle of a further embodiment, the drive pulley 120 is arranged above the driven pulley shaft 130 and, at the same time, the water pump 190 is arranged on the shaft end of the drive pulley shaft 110 and hence, the water pump 190 is arranged at a position higher than the driven pulley shaft 130, such that, water pump 190 is located at an upper high position of the power unit 40. Accordingly, even when the water pump 190 is arranged on the shaft end of the drive pulley shaft 110, it is possible to prevent the water pump 190 from influencing a bank angle θ of a vehicle 10 determined by a step 38.

Further, according to the power unit 40 of the motorcycle of this embodiment, the power unit 40 includes the oil pump 180 which supplies oil to the continuously variable transmission 100 including the transmission input clutch 160 and the starter clutch 170. The oil pump 180 and the water pump 190 are arranged on the shaft end of the drive pulley shaft 110 so that the oil pump 180 can be arranged on the shaft portion of the drive pulley shaft 110 in the same manner as the water pump 190. Accordingly, it becomes unnecessary to provide drive parts for the oil pump and to arrange space for these drive parts. Therefore, the number of parts can be reduced limiting the weight of the power unit 40 and realizing miniaturization of the power unit 40.

Further, according to the power unit 40 of the motorcycle of this embodiment, the clutch 160 which allows or interrupts the transmission of the rotary drive force of the crankshaft 62 to the drive pulley 120 is arranged between the crankshaft 62 and the drive pulley 120, and the clutch 160 is arranged on one longitudinal side of the drive pulley shaft 110 and the oil pump 180 and the water pump 190 are arranged on another longitudinal side of the drive pulley shaft 110 while sandwiching the continuously variable transmission 100 therebetween. Accordingly, the clutch 160, the oil pump 180 and the water pump 190, which are heavy objects, are arranged on both sides of the vehicle in the vehicle-width direction in a well-balanced manner while sandwiching the continuously variable transmission 100 therebetween, enhancing the maneuverability of the vehicle 10. Further, when the clutch 160, the oil pump 180 and the water pump 190 are arranged on one side of the power unit 40, these parts largely project from only one side of the power unit 40. However, by arranging the clutch 160, the oil pump 180 and the water pump 190 on both sides in the vehicle-width direction while sandwiching the continuously variable transmission 100, it is possible to prevent these parts from largely projecting in the vehicle width direction only on one side of the power unit 40.

Further, according to the power unit 40 of the motorcycle of this embodiment, the power unit 40 includes the bearing 112 which rotatably supports the drive pulley shaft 110, and the oil pump 180 and the water pump 190 are arranged on the longitudinally outer side of the drive pulley shaft 110 opposite the bearing 112. Accordingly, compared to a case in which the oil pump 180 and the water pump 190 are arranged on the longitudinally inner side of the bearing 112, the distance between the bearing 112 and the pulley 120 can be shortened permitting the diameter of a sleeve shaft portion 121*a* of the drive pulley 120 to be decreased. Since the diameter of the shaft on the drive-pulley-120 side can be decreased, the drive pulley 120 can be made smaller and, at the same time, the power unit 40 can be made lighter. Further, since the oil pump 180 and the water pump 190 are arranged on the longitudinally outer side than the bearing 112, assembly and maintenance of the power unit 40 can be enhanced.

Further, according to the power unit 40 of the motorcycle of another embodiment, the water pump 190 is arranged above the center of an axis 62*b* of the crankshaft 62. The water pump 190 is arranged at a position higher than the crankshaft 62, that is, at an upper, high position of the power unit 40. Accordingly, even when the water pump 190 is arranged on a shaft end of the drive pulley shaft 110, it is possible to prevent the water pump 190 from influencing a bank angle θ of a vehicle 10 as determined by a step 38.

Further, according to the power unit 40 of the motorcycle of this embodiment, the transmission input clutch 160, which allows or interrupts the transmission of the rotary drive force of the crankshaft 62 to the drive pulley 120, is arranged between the crankshaft 62 and the drive pulley 120. The starter clutch 170, which allows or interrupts the transmission of a rotary drive force of the driven pulley shaft 130 to the drive wheel 27, is arranged between the driven pulley 140 and the drive wheel 27. The transmission input clutch 160 is arranged on the drive pulley shaft 110, and the starter clutch 170 is arranged on the driven pulley shaft 130. The starter clutch 170 transmits a larger rotary drive force than the transmission input clutch 160 at the time of starting the vehicle or the like and hence, the clutch capacity of the starter clutch 170 is increased whereby the starter clutch 170 becomes heavier than the transmission input clutch. Since the starter clutch 170 is heavier than the transmission input clutch 160 and is arranged below the drive pulley shaft 110, the center of gravity of the engine is unaffected, in spite of a fact that the oil pump 180 and the water pump 190 are arranged on the drive pulley shaft 110 higher on the power unit 40.

Further, according to the power unit 40 of a motorcycle of another embodiment, the continuously variable transmission 100 is arranged in an offset manner toward a right side in the vehicle-width direction from the vehicle body centerline C2 or transverse to the centerline C2. At the same time, the transmission input clutch 160 is arranged on the offset side, and the oil pump 180 and the water pump 190 are arranged on a side opposite to the offset side. Accordingly, it is possible to decrease the projecting quantities of the oil pump 180 and the water pump 190 toward the left side in the vehicle-width direction and hence, it is possible to further prevent the oil pump 180 and the water pump 190 from influencing the bank angle θ of the vehicle 10 determined by the step 38.

Further, according to the power unit 40 of a motorcycle of this embodiment, the power unit 40 includes the oil pump 180 which supplies oil to the continuously variable transmission 100, the transmission input clutch 160, and the starter clutch 170. The drive pulley 120 is rotatably supported on the drive pulley shaft 110 and is, when the transmission input clutch 160 is engaged, rotatably driven together with the drive pulley shaft 110, while the oil pump 180 is mounted on the shaft portion of the drive pulley shaft 110 and is rotatably driven together with the drive pulley shaft 110. Such an arrangement provides the transmission input clutch 160 in a disengaged state at the time of power unit 40 being started making it possible to drive the oil pump 180 without engaging the continuously variable transmission 100. Accordingly, the oil pressure necessary for controlling the transmission input clutch 160 and the continuously variable transmission 100 can be achieved making it possible to push the respective pulleys 120, 140 to the belt 101 by applying the oil pressure to the respective pulleys 120, 140 before engaging the transmission input clutch 160. Therefore, the generation of slippage between the respective pulleys 120, 140 and the belt 101 can be lowered or eliminated at the time of engaging the transmission input clutch 160 after starting the engine.

Further, according to the power unit 40 of a motorcycle of this embodiment, the transmission input clutch 160 and the primary driven gear 96 are arranged on the right side in the vehicle-width direction from the vehicle body center line C2 and, at the same time, the starter clutch 170, the oil pump 180, the water pump 190, the final drive gear 173 and the generator 65 are arranged on the left side in the vehicle-width direction from the vehicle body center line C2. Accordingly, the transmission input clutch 160 and the primary driven gear 96, which are heavy objects, and the starter clutch 170, the oil pump 180, the water pump 190, the final drive gear 173 and the generator 65 are arranged on both sides of the vehicle body center line C2 while sandwiching the vehicle body center line C2 therebetween in a well-balanced manner, the maneuverability of the vehicle 10 can be further enhanced.

Further, according to the power unit 40 of a motorcycle of this embodiment, by arranging the roller bearing 111 in the vicinity of the shaft end where the roller bearing 111 overlaps the ball bearing 112 in the longitudinal direction of the vehicle, it is unnecessary to arrange the bearing on the left shaft end of the drive pulley shaft 110. Accordingly, the number of parts can be reduced resulting in a decrease of the weight of the power unit 40.

The present invention is not limited to the constitution exemplified in the above-mentioned embodiment and can be suitably modified without departing from the gist of the present invention.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

We claim:

1. A power unit for a motorcycle, said power unit comprising:

an engine comprising a crankshaft;

a continuously variable transmission which comprises:

a drive pulley shaft which receives a rotary drive force from the crankshaft, said drive pulley shaft being separate and spaced away from said crankshaft;

a drive pulley which is mounted on the drive pulley shaft, a driven pulley shaft which operatively receives the rotary drive force from the drive pulley shaft, the drive pulley being arranged above the driven pulley shaft, and the driven pulley shaft being substantially balanced with respect to a longitudinal central plane of the motorcycle;

a driven pulley which is mounted on the driven pulley shaft, and a belt which is wrapped around the drive pulley and the driven pulley;

said belt being operable to transmit the rotary drive force of the drive pulley shaft to the driven pulley shaft, and to transmit the rotary drive force of the crankshaft to a drive wheel while continuously changing a vehicle speed by changing wrapping diameters of the belt on the drive pulley and the driven pulley; and a water pump for circulating cooling water inside the engine, wherein said water pump is situated on an end portion of the drive pulley shaft of the continuously variable transmission;

wherein said engine and the transmission are configured such that said water pump does not contact a road surface during a maximum bank angle of the motorcycle thereby allowing maintaining an overall stability of the motorcycle during operation thereof.

2. A power unit for a motorcycle according to claim 1, further comprising an oil pump which supplies oil to the continuously variable transmission, a transmission input clutch, and a starter clutch, wherein the oil pump and the water pump are arranged proximate one another on the end portion of the drive pulley shaft.

3. A power unit for a motorcycle according to claim 2, wherein:

the transmission input clutch, which selectively allows or interrupts transmission of the rotary drive force of the crankshaft to the drive pulley of the continuously variable transmission, is arranged between the crankshaft and the drive pulley, the transmission input clutch is arranged on one longitudinal side of the drive pulley shaft; and the oil pump and the water pump are arranged proximate one another on the other longitudinal side of the drive pulley shaft, while sandwiching the continuously variable transmission between the transmission input clutch and the oil pump.

4. A power unit for a motorcycle according to claim 2, further comprising a bearing which rotatably supports the drive pulley, wherein the oil and water pumps are arranged on a longitudinally outer side of the drive pulley shaft in relation to the bearing.

5. A power unit for a motorcycle according to claim 1, wherein the water pump is arranged at a position located above a central portion of the crankshaft.

6. A power unit for a motorcycle according to claim 2, wherein:

the transmission input clutch is arranged on the drive pulley shaft between the crankshaft and the drive pulley, and is selectively operable to allow or interrupt transmission of the rotary drive force of the crankshaft to the drive pulley, and the starter clutch is arranged on the driven pulley shaft between the driven pulley and the drive wheel, and is selectively operable to allow or interrupt transmission of the rotary drive force of the driven pulley shaft to the drive wheel.

7. A power unit adapted to be mounted on a frame of a motorcycle, the power unit comprising an engine used for providing power, the engine comprising a crankshaft; and a transmission used for transferring the power to a drive wheel from the crankshaft, wherein:

the transmission is a continuously variable transmission having a drive pulley shaft; and a driven pulley shaft, said continuously variable transmission being operable to receive rotary drive force from the crankshaft, wherein the drive pulley shaft is arranged above the driven pulley shaft, wherein said drive pulley shaft is separate and spaced away from said crankshaft; and the driven pulley shaft is substantially balanced with respect to a longitudinal central plane of the motorcycle;

the power unit comprises a water pump for circulating cooling water, the water pump being arranged on an end portion of the drive pulley shaft of the continuously variable transmission;

wherein said engine and the transmission are configured such that said water pump does not contact a road surface during a maximum bank angle of the motorcycle thereby allowing maintaining an overall stability of the motorcycle during operation thereof, and the transmission is operable to transmit the rotary drive force of the crankshaft to a drive wheel while continuously changing speed.

8. The power unit of claim 7, wherein:

the drive pulley shaft has a drive pulley at one end thereof, and the water pump at the other end thereof, and the drive pulley and the driven pulley shaft are rotatably interconnected.

9. The power unit of claim 7, further comprising:

an oil pump for supplying oil to the transmission, a transmission clutch, and a starter clutch, and wherein the oil pump and the water pump are disposed proximate one another on one end of the drive pulley shaft.

10. The power unit of claim 7, wherein:

the transmission includes a starter clutch which is operable to selectively allow or interrupt transmission of rotary drive force to the drive wheel, and the starter clutch is provided on one end of the drive pulley shaft, and an oil pump and the water pump are provided proximate one another at an opposite end of the drive pulley shaft.

11. The power unit of claim 7, further comprising a starter clutch and an oil pump; said starter clutch being operable to selectively allow or interrupt the transmission of the rotary force to the drive wheel; wherein:

the transmission is located between the water pump and the starter clutch, and the oil pump is located adjacent to one end of the water pump.

12. The power unit of claim 7, wherein:

the power unit further comprises an oil pump for circulating transmission oil through the transmission, the oil pump and the water pump are provided on the drive pulley shaft, and the oil pump and the water pump are located above the crankshaft.

13. The power unit of claim 7, wherein:

the power unit and a frame are component parts of a motorcycle;

said motorcycle comprising:

the drive wheel arranged at a rear portion of said frame, a steerable front wheel, and a seat, wherein, the motorcycle is operable to turn at said maximum bank angle while maintaining stability during operation thereof.

14. The power unit of claim 7, wherein:

the power unit and a frame are component parts of a motorcycle;

said motorcycle comprising:

a front wheel, said drive wheel comprising a rear wheel, and a seat, the motorcycle having a center of gravity, wherein the motorcycle is operable to turn at said maximum bank angle during operation thereof, the maximum bank angle limiting an amount the motorcycle can be tilted during operation without having a portion of the motorcycle contact a horizontal surface to detrimentally affect steering ability of the motorcycle, and wherein a protuberance is located high on the power unit with respect to the frame, such that the protuberance does not substantially reduce the maximum bank angle.

15. The power unit of claim 7, wherein:

the water pump protrudes laterally outwardly from the side of the power unit, the power unit and a frame are component parts of a motorcycle, the motorcycle has the maximum bank angle which affects the maneuverability of the motorcycle, and the water pump is located on the power unit at a position higher than a position of the crankshaft such that, during operation of the motorcycle, the water pump does not substantially influence the maximum bank angle of the motorcycle.

16. The power unit of claim 7, further comprising:

an oil pump for providing oil to the transmission, said oil pump being mounted on the drive pulley shaft, and a transmission clutch, wherein:

the oil pump is operable at engine startup to provide pressurized oil to the transmission, and the transmission clutch is operable to prevent initial operation of the transmission such that when the transmission clutch is released, the oil pressure is at operating levels.

17. A motorcycle comprising:

a frame, a front wheel pivotally attached to the frame and steerable by movement of a handlebar, a rear wheel rotatably attached to the frame, and a power unit operatively mounted on the frame, the motorcycle having a maximum bank angle and center of gravity during operation thereof that affect the maneuverability of the motorcycle, wherein:

the power unit comprises an engine comprising a crankshaft; and a transmission, the power unit operatively provides rotary force to a drive wheel comprising the rear wheel of the motorcycle, the transmission is a continuously variable transmission which provides power to the drive wheel while continuously changing the motorcycle speed during operation thereof, the transmission comprises:

a drive pulley shaft being separate and spaced away from the crankshaft, a drive pulley mounted on the drive pulley shaft, a driven pulley shaft being substantially balanced with respect to a longitudinal central plane of the motorcycle, a driven pulley mounted on the driven pulley shaft, and a belt interconnecting the drive pulley and the driven pulley, and a water pump for circulating cooling water inside the engine, the water pump being arranged on an end of the drive pulley shaft, and protruding from a side of the power unit;

wherein said engine and the transmission are configured such that said water pump does not contact a road surface during a maximum bank angle of the motorcycle thereby allowing maintaining stability of the motorcycle during operation thereof.

18. The motorcycle of claim 17, wherein the power unit further comprises an oil pump for providing oil to the transmission, a transmission clutch and a starter clutch, and wherein the oil pump and the water pump are situated proximate one another on an end portion of the drive pulley shaft.

19. The motorcycle of claim 17, wherein the drive pulley is located above the driven pulley.

20. The motorcycle according to claim 17, wherein said power unit is arranged on the frame such that the power unit is substantially balanced with respect to the longitudinal central plane of the motorcycle.

* * * * *